(12) United States Patent
Fang et al.

(10) Patent No.: US 11,714,921 B2
(45) Date of Patent: Aug. 1, 2023

(54) IMAGE PROCESSING METHOD WITH ASH CODE ON LOCAL FEATURE VECTORS, IMAGE PROCESSING DEVICE AND STORAGE MEDIUM

(71) Applicants: BOE TECHNOLOGY GROUP CO., LTD., Beijing (CN); PEKING UNIVERSITY, Beijing (CN)

(72) Inventors: Yigeng Fang, Beijing (CN); Xiaojun Tang, Beijing (CN); Yadong Mu, Beijing (CN)

(73) Assignees: BOE TECHNOLOGY GROUP CO., LTD., Beijing (CN); PEKING UNIVERSITY, Beijing (CN)

(*) Notice: Subject to any disclaimer, the term of this patent is extended or adjusted under 35 U.S.C. 154(b) by 406 days.

(21) Appl. No.: 16/916,872

(22) Filed: Jun. 30, 2020

(65) Prior Publication Data
US 2021/0099310 A1 Apr. 1, 2021

(30) Foreign Application Priority Data
Sep. 27, 2019 (CN) .......................... 201910923691.5

(51) Int. Cl.
| | |
|---|---|
| H04L 9/32 | (2006.01) |
| G06F 21/64 | (2013.01) |
| G06N 3/08 | (2023.01) |
| H04L 9/06 | (2006.01) |
| G06V 10/764 | (2022.01) |
| G06V 10/82 | (2022.01) |
| G06V 10/44 | (2022.01) |

(52) U.S. Cl.
CPC .............. *G06F 21/64* (2013.01); *G06N 3/08* (2013.01); *G06V 10/454* (2022.01); *G06V 10/764* (2022.01); *G06V 10/82* (2022.01); *H04L 9/0643* (2013.01); *H04L 9/3247* (2013.01)

(58) Field of Classification Search
None
See application file for complete search history.

(56) References Cited

U.S. PATENT DOCUMENTS

| | | | | |
|---|---|---|---|---|
| 2006/0013473 A1* | 1/2006 | Woodfill | ............. | H04N 13/239 382/154 |
| 2006/0276945 A1* | 12/2006 | Kong | ................ | B60R 21/01538 701/45 |
| 2007/0271226 A1* | 11/2007 | Zhang | ..................... | G06F 16/58 |
| 2010/0272350 A1* | 10/2010 | Lee | ......................... | G06V 10/70 382/165 |
| 2011/0229025 A1* | 9/2011 | Zhao | .................... | G06V 10/774 382/165 |
| 2016/0334546 A1* | 11/2016 | Ma | .......................... | G01W 1/00 |
| 2017/0083731 A1* | 3/2017 | Sanwald | ............ | G06K 7/10861 |

* cited by examiner

*Primary Examiner* — William J. Goodchild

(57) ABSTRACT

Provided are an image processing method, an image matching method, a device, and a storage medium. The image processing method includes: obtaining an image feature of an input image; determining a plurality of local image features of the image feature; determining a plurality of local feature vectors corresponding to the plurality of local image features respectively; determining a hash code of the input image based on the plurality of local feature vectors.

10 Claims, 11 Drawing Sheets

IMAGE PROCESSING METHOD WITH ASH CODE ON LOCAL FEATURE VECTORS, IMAGE PROCESSING DEVICE AND STORAGE MEDIUM

The present application claims priority of Chinese Patent Application No. 201910923691.5 filed on Sep. 27, 2019, the disclosure of which is incorporated herein by reference in its entirety as part of the present application.

TECHNICAL FIELD

The present disclosure relates to a field of image data processing, and more particularly, to an image processing method, an image matching method, a device, and a storage medium.

BACKGROUND

An image hashing technology may help search and match of images. Good image hash codes should have locality-sensitive properties, that is, hash codes of similar images are also similar. Traditional image hashing technologies having locality-sensitive properties are divided into two types: data-independent random hash algorithms, and hash algorithms based on data and machine learning technologies. Current mainstream methods include generating a binary vector of a hash code for each image. Each bit in such a hash code condenses information of the entire image. However, such a mode of hash coding is extremely unfavorable for dealing with circumstances such as local matching of images.

SUMMARY

According to an aspect of the present application, it is provided an image processing method, comprising: obtaining an image feature of an input image; determining a plurality of local image features of the image feature; determining a plurality of local feature vectors corresponding to the plurality of local image features respectively; determining a hash code of the input image based on the plurality of local feature vectors.

In some embodiments, the determining a plurality of local image features of the image feature includes: segmenting the image feature at a preset size, to determine a plurality of local regions of the image feature; determining information of the image feature that corresponds to each local region in the plurality of local regions as a local image feature corresponding to the local region respectively.

In some embodiments, the image feature includes feature maps of a plurality of channels, and the local image feature corresponding to each local region includes a channel local feature of a corresponding local region of the feature map of each channel in the feature maps of the plurality of channels.

In some embodiments, the determining a plurality of local feature vectors corresponding to the plurality of local image features respectively includes: pooling the channel local feature of the corresponding local region in a feature map of each channel for each local image feature, to determine the local feature vector corresponding to the local image feature.

In some embodiments, the determining a hash code of the input image based on the plurality of local feature vectors, includes: mapping each of the plurality of local feature vectors into each of a plurality of sub-hash codes of an equal length respectively; and combining the plurality of sub-hash codes to obtain the hash code of the input image.

In some embodiments, the combining the plurality of sub-hash codes to obtain the hash code of the input image includes: arranging the plurality of sub-hash codes according to a spatial arrangement mode of a local region corresponding each sub-hash code, to obtain the hash code of the image.

In some embodiments, the hash code includes a plurality of layers, an i-th layer of the hash code includes an i-th hash bit of each sub-hash code, and the i-th layer is a matrix formed by arranging the i-th hash bit of the sub-hash code according to the spatial arrangement mode of the local region corresponding to each sub-hash code, where i is an integer greater than or equal to 1 and less than or equal to K, and K is a length of each sub-hash code.

In some embodiments, obtaining an image feature of an input image includes: extracting the image feature of the input image by a trained neural network.

According to another aspect of the present application, it is also provided an image matching method, for matching a first image and a second image, wherein the first image is expressed as a first hash code, the first hash code includes a plurality of first layers, each first layer is a first matrix formed by a plurality of first hash bits; the second image is expressed as a second hash code, the second hash code includes a plurality of second layers, each second layer is a second matrix formed by a plurality of second hash bits; the number of the first layers included in the first hash code and the number of the second layers included in the second hash code are equal to each other; the first matrix and the second matrix have an equal size; and the image matching method comprises: determining a hamming distance between the first hash code and the second hash code, to determine a matching degree between the first image and the second image.

In some embodiments, the determining a hamming distance between the first hash code and the second hash code includes: determining a plurality of layer hamming distances by respectively using the plurality of first layers of the first hash code and the plurality of corresponding second layers of the second hash code; and determining a sum of the plurality of layer hamming distances as the hamming distance between the first hash code and the second hash code.

In some embodiments, the first matrix and the second matrix have an equal size; and the determining a hamming distance between each first layer in the first hash code and a second layer in a corresponding position in the second hash code includes: segmenting, for each first matrix, the first matrix at a predetermined matching size, to determine a plurality of first local regions in the first matrix, segmenting, for each second matrix, the second matrix at the predetermined matching size, to determine a plurality of second local regions in the second matrix, respectively determining, for each first local region, a plurality of local hamming distances between the first local region and each second local region of the plurality of second local regions; and determining the hamming distance between the first layer and the corresponding second layer according to the plurality of local hamming distances.

According to another aspect of the present application, it is also provided an image data processing device, the device comprising a memory and a processor, wherein the memory has instructions stored thereon, and when the processor is used to execute the instructions, the processor is caused to execute the image processing method mentioned above.

In some embodiments, the determining a plurality of local image features of the image feature includes: segmenting the image feature at a preset size, to determine a plurality of local regions of the image feature; determining information of the image feature that corresponds to each local region in the plurality of local regions as a local image feature corresponding to the local region, respectively.

In some embodiments, the image feature include feature maps of a plurality of channels, the local image feature corresponding to each local region includes a channel local feature of a corresponding local region of a feature map of each channel in the feature maps of the plurality of channels.

In some embodiments, the determining a plurality of local feature vectors respectively corresponding to the plurality of local image features includes: pooling the channel local feature of a corresponding local region in the feature map of each channel with respect to each local image feature, to determine the local feature vector corresponding to the local image feature.

In some embodiments, the determining a hash code of the input image based on the plurality of local feature vectors includes: mapping the plurality of local feature vectors into a plurality of sub-hash codes of an equal length, respectively; and combining the plurality of sub-hash codes to obtain the hash code of the input image.

In some embodiments, the combining the plurality of sub-hash codes to obtain the hash code of the input image includes: arranging the plurality of sub-hash codes according to a spatial arrangement mode of a local region corresponding each sub-hash code, to obtain the hash code of the image.

According to another aspect of the present application, it is also provided an image matching device, the device comprising a memory and a processor, wherein the memory has instructions stored thereon, and when the processor is used to execute the instructions, the processor is caused to execute the image matching method mentioned above.

In some embodiments, the determining a hamming distance between the first hash code and the second hash code includes: determining a plurality of layer hamming distances by respectively using the plurality of first layers of the first hash code and the plurality of corresponding second layers of the second hash code; and determining a sum of the plurality of layer hamming distances as the hamming distance between the first hash code and the second hash code.

According to another aspect of the present application, it is also provided a computer-readable storage medium, having instructions stored thereon, wherein the instructions, when executed by a processor, causes the processor to execute the method mentioned above.

By using the image processing method and the image matching method provided by the present disclosure, a hash code containing image spatial information can be generated for an image, and the spatial information of the hash code may be used to perform matching between images, thereby improving accuracy of retrieval and matching for locally matched images.

BRIEF DESCRIPTION OF THE DRAWINGS

In order to clearly illustrate the technical solutions of the embodiments of the present disclosure, the drawings that need to be used in description of the embodiments will be briefly described in the following. It is obvious that the described drawings are only related to some embodiments of the present disclosure; based on the drawings. Those ordinarily skilled in the art can acquire other drawings, without any inventive effort. The following drawings are not intentionally scaled according to actual sizes, and the emphasis is on showing the subject matter of the present disclosure.

DETAILED DESCRIPTION

Figure 1:
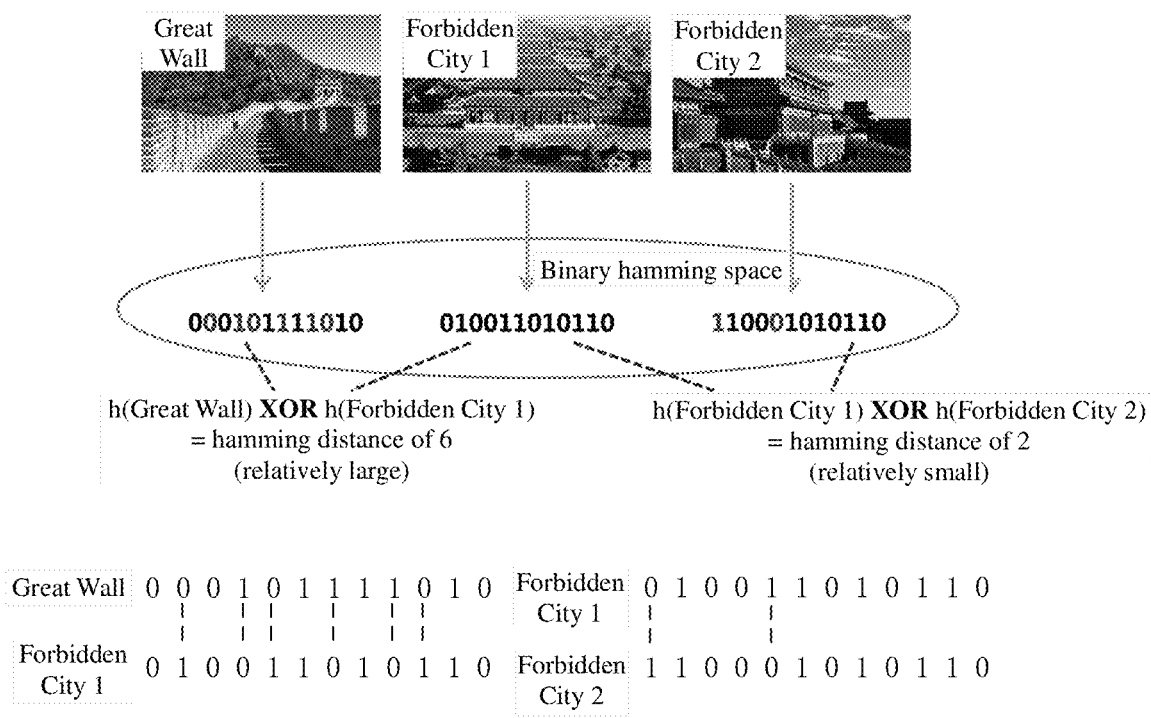
FIG. 1 shows a hash algorithm based on locality-sensitive performance.

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise specified, the technical terms or scientific terms used herein should be of general meaning as understood by those ordinarily skilled in the art. In the present application, words such as "first", "second" and the like do not denote any order, quantity, or importance, but rather are used for distinguishing different components. Similarly, words such as "include" or "comprise" and the like denote that elements or objects appearing before the words of "include" or "comprise" cover the elements or the objects enumerated after the words of "include" or "comprise" or equivalents thereof, not exclusive of other elements or objects. Words such as "connected" or "connecting" and the like are not limited to physical or mechanical connections, but may include electrical connection, either direct or indirect. Words such as "up", "down", "left", "right" and the like are only used for denoting relative positional relationship, when the absolute position of the described object is changed, the relative positional relationship may also be correspondingly changed.

With development of computer vision technologies, expressions of image visual features become more refined. Unlike features such as traditional Histograms of Oriented Gradients (HOG), image features currently used to express image information usually have relatively high dimensions. For example, image features obtained based on FisherVector encoding usually have tens of thousands of dimensions. For another example, before passing through a final pooling layer, image features obtained by using a deep neural network (e.g., ResNet) usually also have tens of thousands of dimensions. This means that greater storage complexity is required to express a single image. With respect to tasks such as image search, processing of large-scale image data sets renders very high cost of storing visual features of the entire data sets, which are difficult to be read into a memory of a single server, and data input and output are required to be repeated between the memory and an external storage during running of algorithms, which increases corresponding time of the algorithm.

Therefore, in a process of performing operations such as retrieval and matching on the image, the above-described retrieval and matching operations may be conveniently executed by denoting the image as a hash code. The hash code can condense complex image information into simple data information having a predefined structure, such as binary data information.

FIG. 1 shows a hash algorithm based on locality-sensitive properties. The hash algorithm uses a plurality of hash functions to associate a picture with a binary hash code having a predetermined length (or a string expressed by any other character). A hamming distance between hash codes may be used to express similarity between pictures associated with the hash codes. For example, with respect to two pictures with high similarity (e.g., similarity measured based on semantic similarity or similarity measured based on visual similarity), a hamming distance between hash codes of such two pictures is also relatively small.

The hamming distance used in the present application represents the number of positions where symbols in corresponding positions of two strings (e.g., hash codes expressed by 0, 1 or strings expressed by any other character) having an equal length are different. With respect to hash codes, when determining a hamming distance between two hash codes having an equal length, symbols in respective corresponding positions in the two hash codes may be compared. If symbols in a corresponding position of the two hash codes are different (for example, one is 0 and the other is 1), then the hamming distance between the two hash codes may be increased by one. By comparing the symbols in each corresponding position of the two hash codes in the above-described mode, a final hamming distance between the two hash codes may be determined.

It can be understood that, without departing from the principle of the present disclosure, the hamming distance used here may also be varied, as long as similarity between two hash codes can be reflected. For example, similarity between two hash codes may also be expressed by the number of positions where symbols in corresponding positions of the two hash codes are the same. In this case, the more digits having a same symbol, the higher the similarity of the two hash codes, that is, the higher the similarity between contents respectively expressed by the two hash codes.

As shown in FIG. 1, a hash code of a picture "the Great Wall" may be expressed as "000101111010"; a hash code of a picture "the Forbidden City 1" may be expressed as "010011010110"; and a hash code of a picture "the Forbidden City 2" may be expressed as "110001010110". When determining a hamming distance between the hash codes of the picture "the Great Wall" and the picture "the Forbidden City 1", the hamming distance between the two hash codes may be determined by calculating the number of positions having different symbols in corresponding positions between the hash code "000101111010" and the hash code "010011010110". As shown in FIG. 1, between the hash codes of the picture "the Great Wall" and the picture "the Forbidden City 1", symbols at bits 2, 4, 5, 7, 9, 10 are different; and therefore, the hamming distance between the hash codes of the picture "the Great Wall" and the picture "the Forbidden City 1" is 6. Similarly, it may be determined that symbols at bits 1, 5 are different between the picture "the Forbidden City 1" and the picture "the Forbidden City 2", that is, a hamming distance between the picture "the Forbidden City 1" and the picture "the Forbidden City 2" is 2. Therefore, similarity between the hash codes of the picture "the Forbidden City 1" and the picture "the Forbidden City 2" is higher, which means that similarity between the picture "the Forbidden City 1" and the picture "the Forbidden City 2" is higher.

Common hash algorithms include two types: a data-independent solution and a data-driven solution. The data-independent solution refers to generating a hash function based on randomness. The data-driven solution refers to generating a hash code based on a machine learning method and a large amount of training data.

Figure 2A:
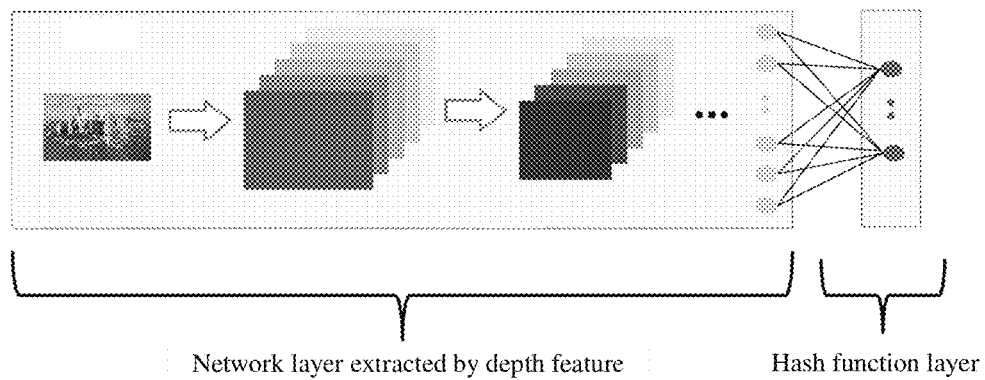
FIG. 2A shows a model that uses a deep neural network as a main component of a hash function according to an embodiment of the present application.

FIG. 2A shows a model that uses a deep neural network as a main component of a hash function according to an embodiment of the present application. As shown in FIG. 2A, the deep neural network may be used to extract depth features of an image, and a hash function layer may be used to generate a hash code with respect to the above-described depth features. It can be understood that, the above-described hash function layer may be trained by using a preset training data set.

In the embodiments provided by the present application, a specific mode of generating a hash code will not be limited. In other words, the data-independent solution may be used to generate a hash code for an image, or the data-driven solution may also be used to generate a hash code for an image, or any other possible data processing method may also be used to generate a hash code for an image, as long as the generated hash code can express image information in the image.

Figure 2B:
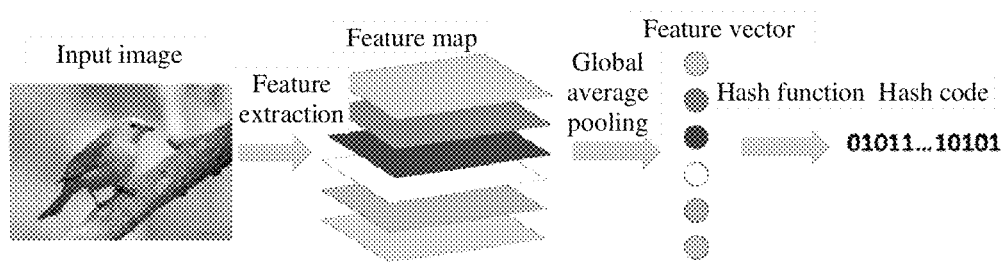
FIG. 2B shows an example of a hash code generation process according to the present application.

FIG. 2B shows an example of a hash code generation process according to the present application. As shown in FIG. 2B, feature maps of an input image may be determined. In some embodiments, feature maps of the input image may include at least one channel. The feature map of each channel in the at least one channel may be processed in a global average pooling mode, to obtain a feature vector denoting the input image. Then, the feature vector may be processed by using any one of the foregoing hash code generation modes to obtain a hash code denoting the input image.

It can be understood that, each hash bit in the hash code generated by using the process in FIG. 2B contains global information denoting the image. Spatial region information of the image (corresponding to spatial information contained in the image) is erased by operations such as pooling. Therefore, if there is partially offset similar information in the two images, that is, same or similar images are contained in different local regions, the hash code generated by using the process shown in FIG. 2B may not express such local similarity. Therefore, the image hash code generated by using the process in FIG. 2B cannot reasonably cope with such a search task for images having characteristics such as partial offset. That is to say, if there are locally similar regions in the two images, the hash code generated by using the method shown in FIG. 2B cannot express similarity of such image information.

Figure 2C:
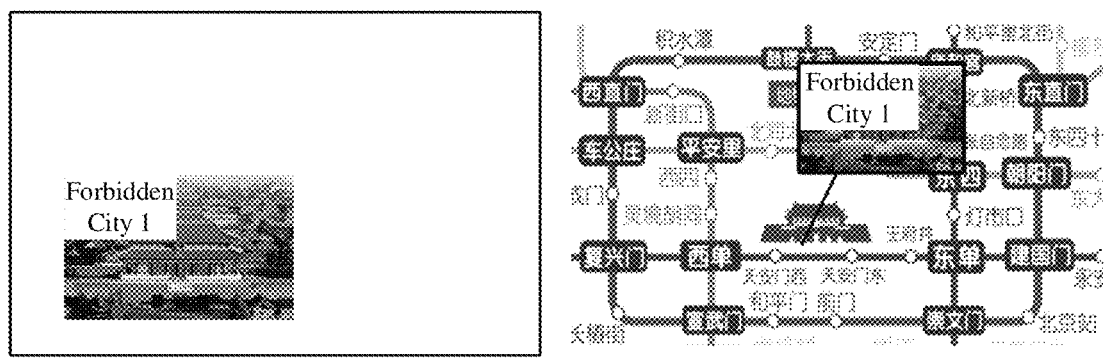
FIG. 2C shows a schematic diagram of two images having local similarity.

FIG. 2C shows a schematic diagram of two images having local similarity. A lower left corner of a left picture of FIG. 2C shows an image of the Forbidden City, a right picture of FIG. 2C shows a subway map, and a location of the Forbidden City is marked in the middle of the subway map in a pictorial way. It can be seen that a local region in the right picture of FIG. 2C contains a local image in the lower left corner of the left picture in FIG. 2C, but global features of the two images shown in FIG. 2C may have a relatively great difference. Therefore, the method shown in FIG. 2B may fail to recognize similarity between the two images in FIG. 2C.

Hereinafter, the image processing method provided by the present application will be described in conjunction with the embodiments provided by the present application.

Figure 3:
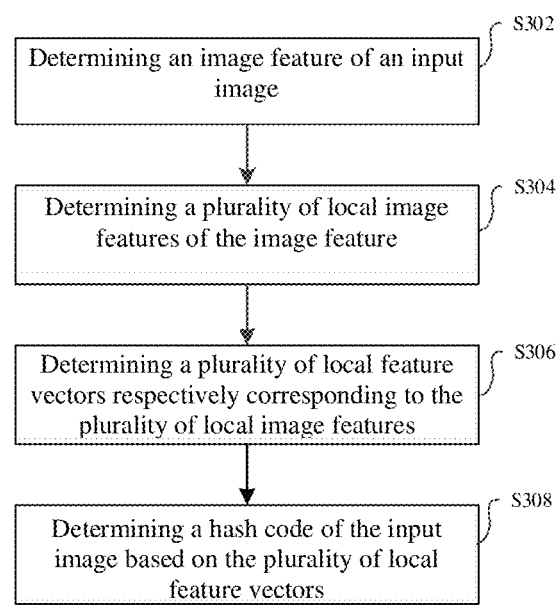
FIG. 3 shows a schematic flow chart of an image data processing method according to an embodiment of the present application.

FIG. 3 shows a schematic flow chart of an image processing method according to an embodiment of the present application.

As shown in FIG. 3, in step S302, an image feature of an input image may be determined.

In some embodiments, a trained neural network may be used to extract the image feature of the input image. For example, a convolutional neural network may be used to process the input image to obtain the image feature of the input image.

In other embodiments, the image feature of the input image may be determined by calculating, for example, histograms of oriented gradients of the image. A specific form of the image feature of the input image will not be limited here. In fact, those skilled in the art may determine the image feature of the input image in any possible mode.

In some embodiments, the image feature of the input image may be expressed in a form of a feature map, wherein the feature map may be expressed in a form of a two-dimensional matrix. In some implementations, the image feature of the input image may include feature maps of a plurality of channels, in which the feature maps of the respective channels have a same size.

In step S302, a plurality of local image features of the image feature may be determined.

In some embodiments, the image feature may be segmented at a preset size, to determine a plurality of local regions of the image feature that have the preset size. Then, information of the image feature that corresponds to each local region in the plurality of local regions may be respectively determined as a local image feature corresponding to the local region.

It can be understood that, when the image feature of the input image is composed of the feature maps of the plurality of channels, the above-described segmentation of the image feature at a preset size refers to segmenting a feature map of each channel at a preset size.

Figure 4A:
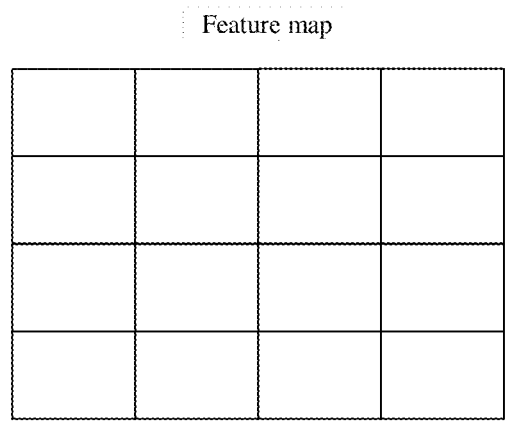
FIG. 4A and FIG. 4B show schematic diagrams of determination a local image feature according to an embodiment of the present application.
Figure 4B:
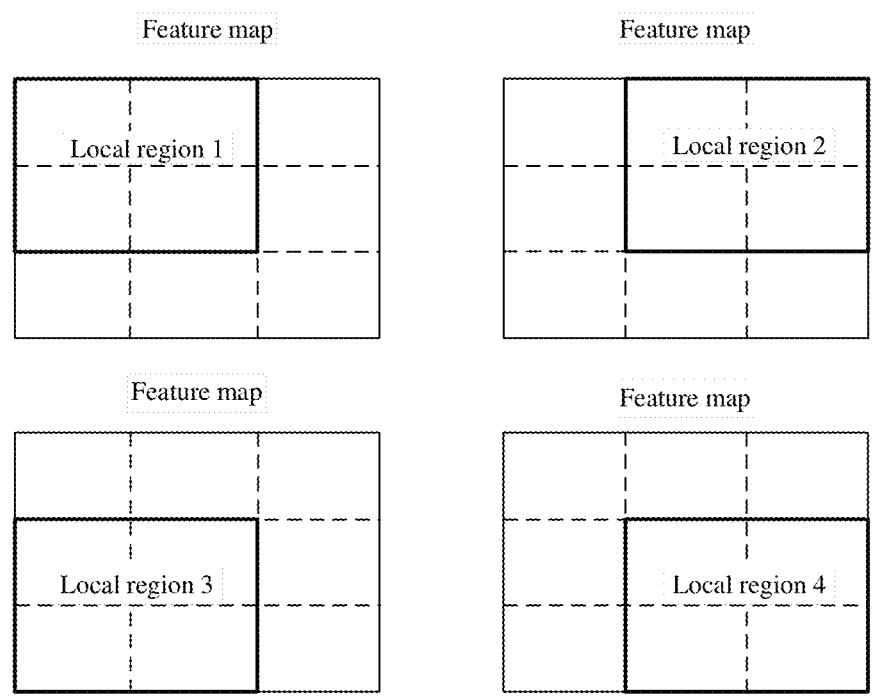

FIG. 4A and FIG. 4B show schematic diagrams of determination of local image features according to the embodiment of the present application.

As shown in FIG. 4A, in one implementation, the image feature may be divided into a plurality of non-overlapping local regions at a preset size. The principle of the present disclosure is described in FIG. 4A by taking that a size of the local region is 1/16 of a size of the feature map as an example. However, it can be understood that, those skilled in the art may set the size of the local region according to actual needs. For example, the size of the local region may also be any proportion such as 1/4, 1/5, 1/6, etc. of the size of the feature map.

As shown in FIG. 4B, in another implementation, the image feature may also be segmented at a preset size and a plurality of partially-overlapping local regions in the image feature are determined. As shown in FIG. 4B, a size of a local region is 4/9 of the size of the feature map. A local region 1, a local region 2, a local region 3, and a local region 4 shown in FIG. 4B have an equal size, and there is an overlapping portion between any two local regions.

Referring back to FIG. 3, the image feature may be segmented in the modes shown in FIG. 4A and FIG. 4B, and a plurality of local image features of the image feature may be determined. When the image feature is expressed as feature maps of a plurality of channels, a local image feature corresponding to each local region includes a channel local feature of a corresponding local region of a feature map of each channel in the feature maps of the plurality of channels used for the image. That is to say, each local image feature also includes local feature maps of the plurality of channels.

In step S306, a plurality of local feature vectors corresponding to the plurality of local image features respectively may be determined.

In some embodiments, with respect to each local image feature, a channel local feature of a corresponding local region in a feature map of each channel in the local image feature may be pooled to determine a local feature vector corresponding to the local image feature. The pooling described here may include one or more of maximum pooling, minimum pooling, and average pooling.

In a case where the image feature includes the feature maps of the plurality of channels, a local feature map of each channel may be pooled respectively, and a pooling result of each channel may be used as an element of the local feature vector. The number of elements of the local feature vector obtained in this way is equal to the number of channels of the feature maps of the image feature.

In step S308, a hash code of the input image may be determined based on the plurality of local feature vectors.

In some embodiments, the plurality of local feature vectors may be respectively mapped into a plurality of sub-hash codes of an equal length. For example, each local feature vector may be mapped into a sub-hash code having a predetermined length, for example, a K-bit hash code, according to a predefined hash function. K is an integer greater than 1, and a value of K depends on configuration of the hash function used specifically.

The hash code of the input image is obtained by combining the plurality of sub-hash codes. In one implementation, the plurality of sub-hash codes may be arranged according to a spatial arrangement mode of the corresponding local regions to obtain the hash code of the image.

Figure 5A:
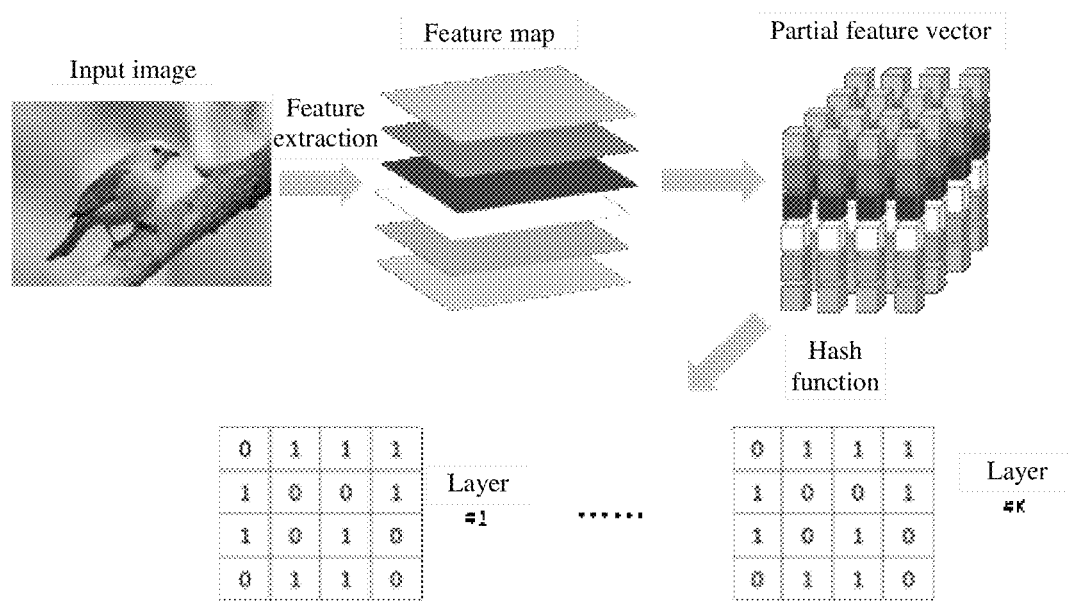
FIG. 5A shows a schematic process for determining a hash code according to an embodiment of the present application.

FIG. 5A shows a schematic process of determining the hash code according to the embodiment of the present application. As shown in FIG. 5A, feature extraction may be performed on the input image to determine the image feature denoting image information of the input image, wherein the image feature includes feature maps of a plurality of channels. Then, the image feature may be segmented at a preset size, to obtain 16 local image features corresponding to 16 local regions. The 16 local regions described here may overlap with each other, or may not overlap with each other.

By pooling a local feature map of each channel among the 16 local image features, 16 local feature vectors used for the input image may be obtained.

Then, a sub-hash code corresponding to the above-described each local feature vector may be obtained, by respectively processing the above-described 16 local feature vectors in any one of the foregoing modes, wherein each sub-hash code includes K hash bits, where K is a predefined positive integer.

The plurality of sub-hash codes is arranged according to the spatial arrangement mode of the corresponding local regions, to obtain the hash code of the image. Therefore, the hash code obtained by using the method provided by the embodiments of the present application includes a plurality of layers, wherein each layer is a matrix formed of a plurality of hash bits. As shown in FIG. 5A, a finally generated hash code includes K layers. With respect to a matrix of an i-th layer (where i is an integer greater than or equal to 1 and less than or equal to K), the matrix is formed by arranging i-th elements of respective sub-hash codes, and elements of each sub-hash code are arranged according to a spatial arrangement mode of a local region corresponding to the sub-hash code.

Figure 5B:
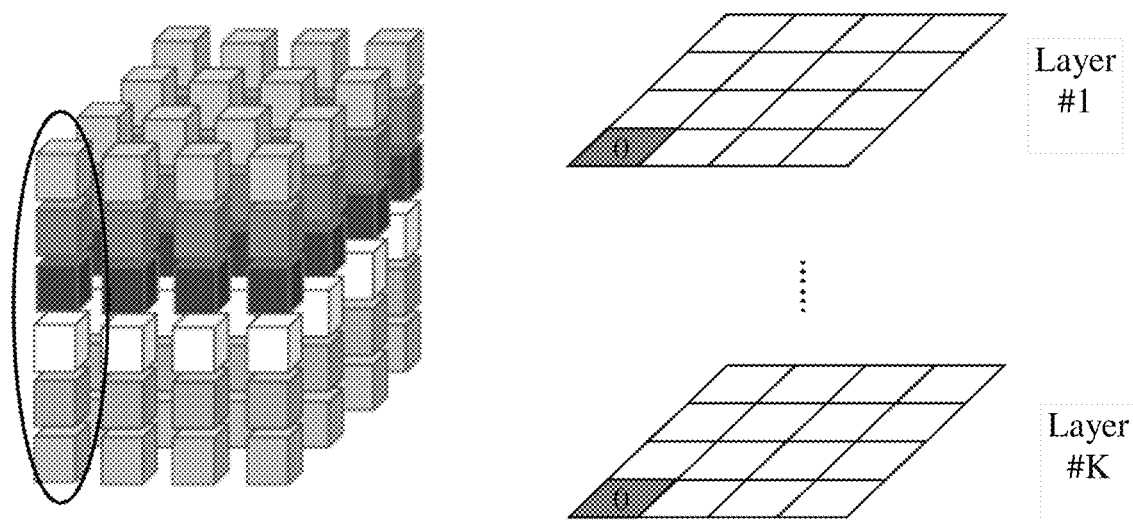
FIG. 5B shows a schematic diagram of arranging a plurality of sub-hash codes according to an embodiment of the present application.

FIG. 5B shows a schematic diagram of arranging the plurality of sub-hash codes according to the embodiment of the present application. As shown in FIG. 5B, a local feature vector within a circle in a left diagram of FIG. 5B may be mapped into a hash code having K elements, wherein the local feature vector within the ellipse circle in the left diagram of FIG. 5B may correspond to hash bits having a gray background in the right diagram of FIG. 5B. It can be seen that, by arranging the plurality of sub-hash codes according to the spatial arrangement mode of the local regions corresponding to the local feature vectors, a hash code having a plurality of layers may be obtained, in which the number of layers is equal to a length of each sub-hash code. Each layer may include hash bits of all sub-hash codes in corresponding positions. For example, with respect to the i-th layer, the i-th layer of hash code may be composed of the i-th elements of the respective sub-hash codes, where $1 \leq i \leq K$.

In the mode shown in FIG. 5B, the hash code of the input image may be determined by combining the sub-hash codes determined according to the local feature vectors, wherein each sub-hash code is arranged according to a spatial position of a local region corresponding to a local feature vector, so that the finally obtained hash code can retain the information of local images in the image and spatial relationship between local images in different positions.

By using the method provided by the present application, the hash code for denoting the input image information may be obtained; such a hash code includes a plurality of layers, and each layer is a two-dimensional matrix formed by a plurality of hash bits. One hash bit in each layer may be used to express image information of a local region of the input image, and hash bits in each layer can retain the spatial region information of the input image. When two images have similar local images in different positions, hash bits of a local region in each layer in the hash code generated by using the above-described method can reflect similarity of the local images in corresponding positions.

By using the image processing method provided by the present application, a higher-dimensional hash code for denoting image information may be generated, so that the spatial region information of the image is retained in the generated hash code, to improve expressive power of the hash code for the local image.

Figure 6:
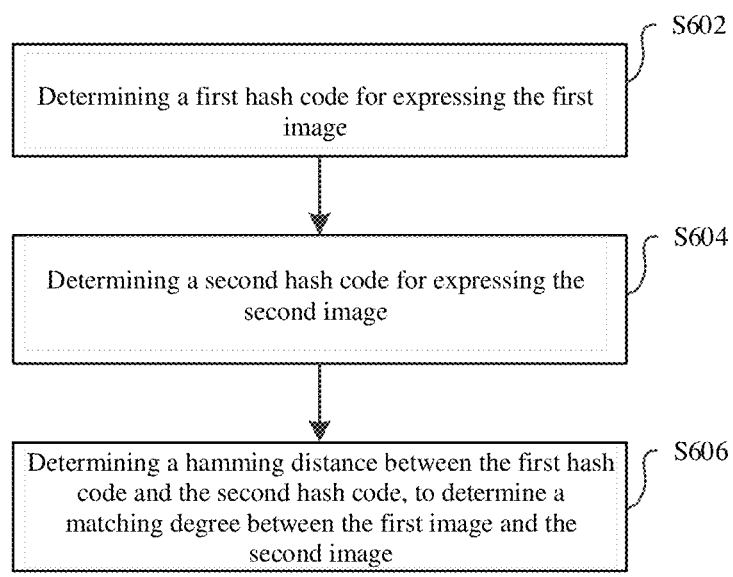
FIG. 6 shows a schematic flow chart of an image matching method according to an embodiment of the present application.

FIG. 6 shows a schematic flow chart of an image matching method provided by an embodiment of the present application. The method 600 shown in FIG. 6 may be used for matching a first image and a second image.

In step S602, the first image may be processed by using the method shown in FIG. 3, to determine a first hash code for denoting the first image. The first hash code includes a plurality of first layers, and each first layer is a first matrix formed by a plurality of first hash bits.

In step S604, the second image may be processed by using the method shown in FIG. 3, to determine a second hash code for denoting the second image. The second hash code includes a plurality of second layers, and each second layer is a second matrix formed by a plurality of second hash bits. As described above, the first hash code and the second hash code have the same number of layers. And each first layer and a corresponding second layer have the same number of hash bits. In some embodiments, each first layer and a corresponding second layer may be matrices of an equal size.

In step S606, the hamming distance between the first hash code and the second hash code may be determined, to determine a matching degree between the first image and the second image. As described above, the smaller the hamming distance between the first hash code and the second hash code, the higher the matching degree between the first image and the second image, the higher the similarity between the first image and the second image.

In some embodiments, the hamming distance between the first hash code and the second hash code may be determined by a layer hamming distance between each first layer in the first hash code and a second layer in the corresponding position in the second hash code. For example, a sum of a plurality of layer hamming distances determined by using a plurality of first layers of the first hash code and a plurality of corresponding second layers of the second hash code may be determined as the hamming distance between the first hash code and the second hash code.

In one implementation, a hamming distance between an i-th first layer in the first hash code and an i-th second layer in the second hash code may be calculated as the layer hamming distance, where $1 \leq i \leq K$.

In some embodiments, when the layer hamming distance between the i-th first layer in the first hash code and the i-th second layer in the second hash code is determined, the layer hamming distance between the first layer and the second layer may be determined by determining a hamming distance between a local hash bit of a predetermined local size in the first layer and a local hash bit of a same local size in the corresponding second layer.

Figure 7A:
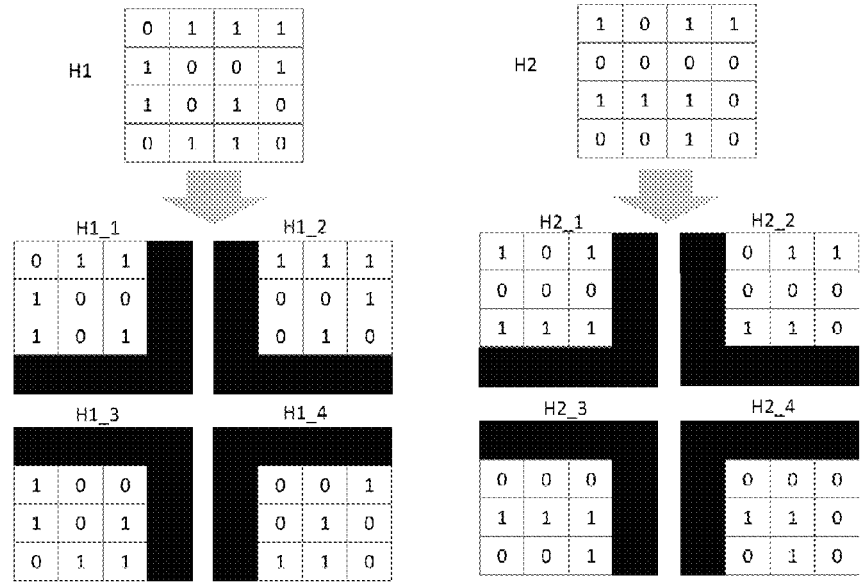
FIG. 7A and FIG. 7B show schematic diagrams of a process for determining a layer hamming distance between a first layer in a first hash code and a second layer in a corresponding position in a second hash code according to an embodiment of the present application.
Figure 7B:
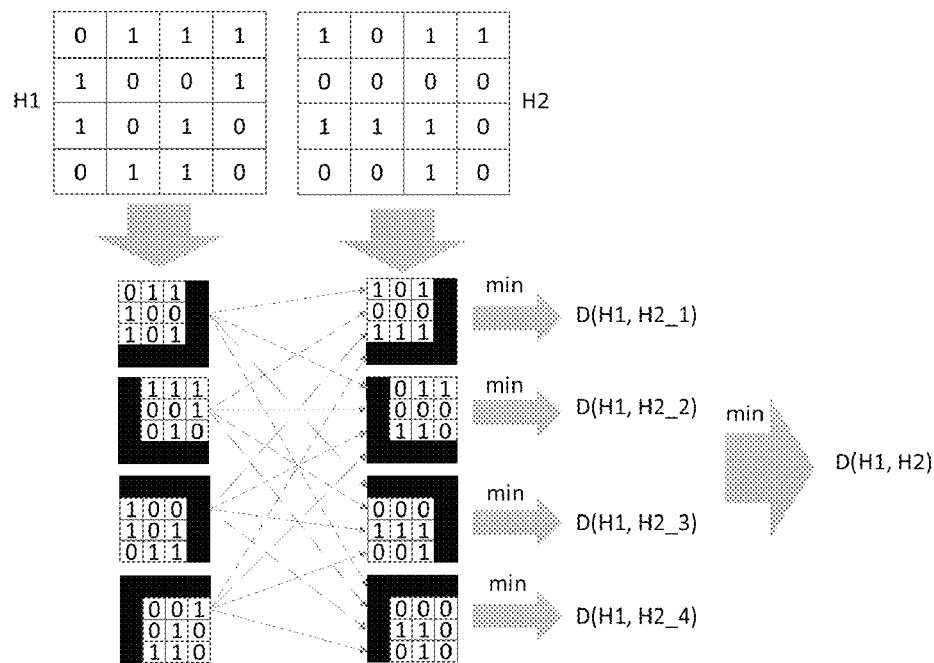

FIG. 7A and FIG. 7B show schematic diagrams of a process of determining a layer hamming distance between a first layer in the first hash code and a second layer in a corresponding position in the second hash code according to the embodiment of the present application.

As shown in FIG. 7A, H1 represents a first layer in the first hash code; and H2 represents a second layer in a position corresponding to H1 in the second hash code. The first layer and the second layer are both 4*4 matrices composed of 16 hash bits.

According to a predetermined local size 3*3, four different local hash bits H1_1, H1_2, H1_3 and H1_4 may be determined in H1, wherein H1_1, H1_2, H1_3 and H1_4 all have a predetermined local size 3*3, and are located in different positions in H1, so they contain information of different spatial regions in the first layer H1. Similarly, four different local hash bits H2_1, H2_2, H2_3 and H2_4 containing different spatial information may also be determined in H2.

By using the process shown in FIG. 7B, hamming distances between each local hash bit in H2 and all local hash bits in H1 may be respectively determined. For example, a hamming distance between H2_1 and H1_1, a hamming distance between H2_1 and H1_2, a hamming distance between H2_1 and H1_3, and a hamming distance between H2_1 and H1_4 may be respectively determined, and a minimum hamming distance from H2_1 to H1_1, H1_2, H1_3 and H1_4 is determined as a hamming distance D(H1, H2_1) between H2_1 and H1.

By using the above-described process, hamming distances D(H1, H2_2), D(H1, H2_3) and D(H1, H2_4) between H2_2, H2_3 and H2_4 and H1 may be similarly determined. Then, a minimum value of the hamming distances between H2_1, H2_2, H2_3 and H2_4 and H1 may be determined as a layer hamming distance D(H1, H2) between H1 and H2.

By using the above-described method, the layer hamming distance between the first layer H1 and the second layer H2 may be determined. By using the method shown in FIG. 7A and FIG. 7B, a layer hamming distance between each first layer of the first hash code and a corresponding second layer of the second hash code may be determined respectively. A sum of the plurality of layer hamming distances determined by using the plurality of first layers of the first hash code and the plurality of corresponding second layers of the second hash code may be determined as the hamming distance between the first hash code and the second hash code.

By using the above-described method, since the hash code determined by using the method shown in FIG. 3 of the present application may retain the spatial region information of the image, similarity between partially matched images may be evaluated more accurately by comparing the hamming distance between local hash bits in different local positions in the corresponding layers of the hash codes. That is to say, by using the image matching process shown in FIG. 7A and FIG. 7B, when the first image and the second image match partially, similarity between the first image and the second image may be determined by the hamming distance between local hash bits of different local regions.

For example, when an upper left corner of the first image and a lower right corner of the second image have similar image information, if similarity between the hash codes of global information is directly determined, it will be difficult to identify similarity of locally similar image information. However, by using the image matching method provided by the present application, it may be judged that similarity between, for example, local hash bits in an upper left portion of a layer of a hash code and local hash bits in a lower right portion of a layer of another hash code is higher (for example, a hamming distance is smaller); by referring to such a hamming distance between the local hash bits to determine a hamming distance between the two hash codes, locally similar image information may be identified.

Figure 8:
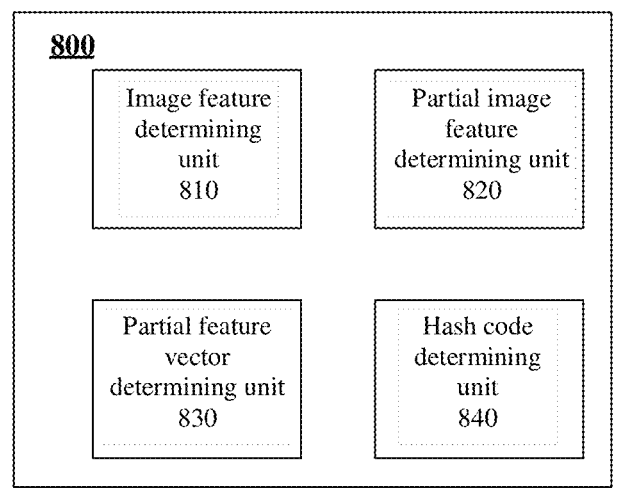
FIG. 8 shows a schematic block diagram of an image data processing device 800 according to an embodiment of the present application.

FIG. 8 shows a schematic block diagram of an image data processing device 800 according to an embodiment of the present application. As shown in FIG. 8, the image data processing device 800 may comprise an image feature determining unit 810, a local image feature determining unit 820, a local feature vector determining unit 830, and a hash code determining unit 840.

The image feature determining unit 810 may be configured to determine an image feature of an input image.

In some embodiments, a trained neural network may be used to extract the image feature of the input image. For example, a convolutional neural network may be used to process the input image to obtain the image feature of the input image.

In other embodiments, the image feature of the input image may be determined by calculating, for example, histograms of oriented gradients of the image. A specific form of the image feature of the input image will not be limited here. In fact, those skilled in the art may determine the image feature of the input image in any possible mode.

In some embodiments, the image feature of the input image may be expressed in a form of a feature map, wherein the feature map may be expressed in a form of a two-dimensional matrix. In some implementations, the image feature of the input image may include feature maps of a plurality of channels, in which the feature maps of the respective channels have a same size.

The local image feature determining unit 820 may be configured to determine a plurality of local image features of the image feature.

In some embodiments, the image feature may be segmented at a preset size, to determine a plurality of local regions of the image feature that have the preset size. Then, information of the image feature that corresponds to each local region in the plurality of local regions may be respectively determined as a local image feature corresponding to the local region.

It can be understood that, when the image feature of the input image are composed of the feature maps of the plurality of channels, the above-described segmenting the image feature at a preset size refers to segmenting a feature map of each channel at a preset size.

In some embodiments, the above-described plurality of local regions may overlap with each other, or may not overlap with each other.

The local feature vector determining unit 830 may be configured to determine a plurality of local feature vectors respectively corresponding to the plurality of local image features.

In some embodiments, with respect to each local image feature, a channel local feature of a corresponding local region in a feature map of each channel in the local image feature may be pooled to determine a local feature vector corresponding to the local image feature. The pooling described here may include one or more of maximum pooling, minimum pooling, and average pooling.

In a case where the image feature includes the feature maps of the plurality of channels, a local feature map of each channel may be pooled respectively, and a pooling result of each channel may be used as an element of the local feature vector. The number of elements of the local feature vector obtained in this way is equal to the number of channels of the feature maps of the image feature.

The hash code determining unit 840 may be configured to determine a hash code of the input image based on the plurality of local feature vectors.

In some embodiments, the plurality of local feature vectors may be respectively mapped into a plurality of sub-hash codes of an equal length. For example, each local feature vector may be mapped into a sub-hash code having a predetermined length, for example, a K-bit hash code, according to a predefined hash function. K is an integer greater than 1, and a value of K depends on configuration of the hash function used specifically.

The hash code of the input image is obtained by combining the plurality of sub-hash codes. In one implementation, the plurality of sub-hash codes may be arranged according to a spatial arrangement mode of the corresponding local regions to obtain the hash code of the image.

By using the method provided by the present application, the hash code for denoting the input image information may be obtained; such a hash code includes a plurality of layers, and each layer is a two-dimensional matrix formed by a plurality of hash bits. Wherein one hash bit in each layer may be used to express image information of a local region of the input image, and hash bits in each layer can retain the spatial region information of the input image.

By using the image data processing device provided by the present application, a higher-dimensional hash code for denoting image information may be generated, so that the spatial region information of the image is retained in the generated hash code, to improve expressive power of the hash code for the local image.

Figure 9:
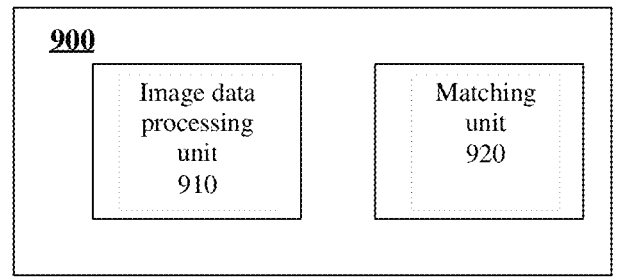
FIG. 9 shows a schematic block diagram of an image matching device 900 according to an embodiment of the present application.

FIG. 9 shows a schematic block diagram of an image matching device 900 according to an embodiment of the present application. As shown in FIG. 9, the image matching device 900 may comprise an image data processing unit 910 and a matching unit 920.

The image data processing unit 910 may be implemented by the image data processing device shown in FIG. 8. The image data processing unit 910 may be configured to process a first image by using the method shown in FIG. 3, to determine a first hash code for denoting the first image. Wherein the first hash code includes a plurality of first layers, and each first layer is a first matrix formed by a plurality of first hash bits.

In order to implement image matching for the first image and a second image, the image data processing unit 910 may be further configured to process the second image by using the method shown in FIG. 3, to determine a second hash code for denoting the second image. Wherein the second hash code includes a plurality of second layers, and each second layer is a second matrix formed by a plurality of second hash bits. As described above, the first hash code and the second hash code have the same number of layers. And each first layer and a corresponding second layer have the same number of hash bits. In some embodiments, each first layer and a corresponding second layer may be matrices of an equal size.

In some embodiments, an image data processing device independently provided may be used to pre-determine the hash codes of the first image and the second image. Therefore, the image data processing unit 910 and the matching unit 920 shown in FIG. 9 may be integrated in one device, or may also be two independent units provided respectively.

The matching unit 920 may be configured to determine a hamming distance between the first hash code and the second hash code, to determine a matching degree between the first image and the second image. As described above, the smaller the hamming distance between the first hash code and the second hash code, the higher the matching degree between the first image and the second image, that is, the higher the similarity between the first image and the second image.

In some embodiments, the hamming distance between the first hash code and the second hash code may be determined by a layer hamming distance between each first layer in the first hash code and a second layer in a corresponding position in the second hash code. For example, a sum of a plurality of layer hamming distances determined by using a plurality of first layers of the first hash code and a plurality of corresponding second layers of the second hash code may be determined as the hamming distance between the first hash code and the second hash code.

In one implementation, a hamming distance between an i-th first layer in the first hash code and an i-th second layer in the second hash code may be calculated as the layer hamming distance, where $1 \leq i \leq K$.

In some embodiments, when determining the layer hamming distance between the i-th first layer in the first hash code and the i-th second layer in the second hash code, the layer hamming distance between the first layer and the second layer may be determined by determining a hamming distance between a local hash bit of a predetermined local size in the first layer and a local hash bit of a same local size in the corresponding second layer.

By using the image matching device provided by the present application, similarity between partially matched images may be evaluated more accurately. When there is partial matching between the first image and the second image, similarity between the first image and the second image may be determined by the hamming distance between local hash bits of different local regions.

Figure 10:
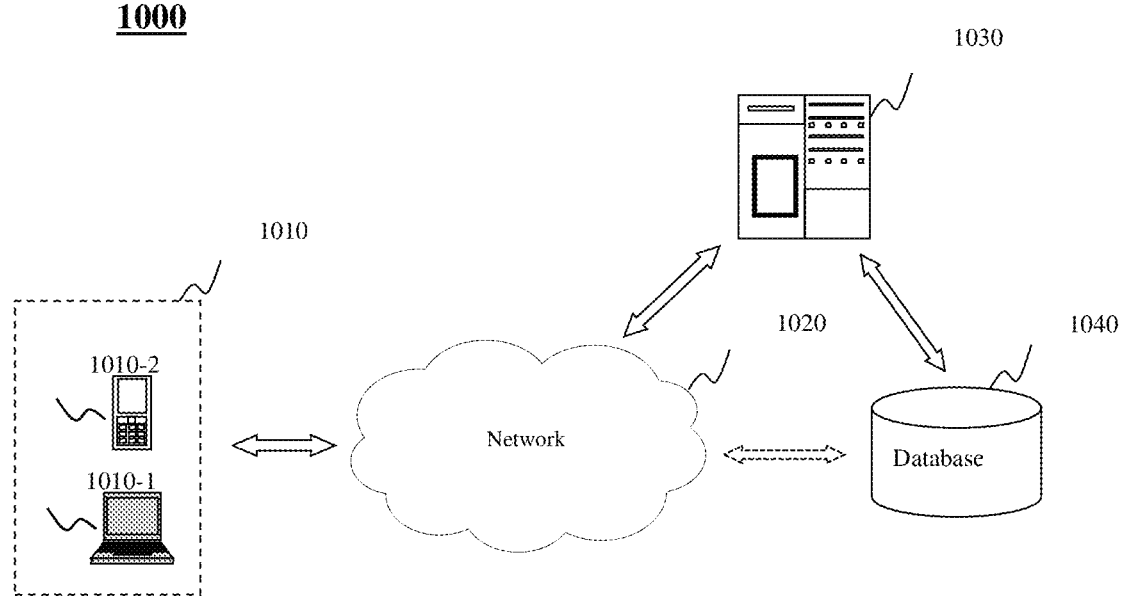
FIG. 10 shows an exemplary scene of an image data processing system according to an embodiment of the present application.

FIG. 10 shows an exemplary scene graph of an image data processing system according to an embodiment of the present application. As shown in FIG. 10, the system 1000 may comprise a user terminal 1010, a network 1020, a server 1030, and a database 1040.

The user terminal 1010 may be, for example, a computer 1010-1 or a mobile phone 1010-2 shown in FIG. 10. It may be understood that, in fact, the user terminal may be any other type of electronic device that can execute data processing, which may include, but is not limited to, a desktop computer, a laptop, a tablet personal computer, a smartphone, a smart home device, a wearable device, a vehicle electronic device, a monitoring device, etc. The user terminal may also be any equipment provided with an electronic device, such as a vehicle and a robot.

The user terminal provided according to the present application may be used to receive an image to be processed, and implement image data processing by using the method provided by the present application. For example, the user terminal may collect the image to be processed through an image collecting device (e.g., a camera, a video camera, etc.) provided on the user terminal. For another example, the user terminal may also receive the image to be processed from an independently-provided image collecting device. For another example, the user terminal may also receive the image to be processed from the server via the network. The image to be processed described here may be a separate image or a frame in a video.

In some embodiments, a processing unit of the user terminal may be used to execute the image processing method and the image matching method provided by the present application. In some implementations, the user terminal may use an application program built in the user terminal to execute the image processing method and the image matching method provided by the present application. In other implementations, the user terminal may execute the image processing method and the image matching method provided by the present application by calling an application program stored outside the user terminal.

In other embodiments, the user terminal sends the received image to be processed to the server 1030 via the network 1020, and the server 1030 executes the image processing method and the image matching method provided by the present application. In some implementations, the server 1030 may use an application program built in the server to execute the image processing method and the image matching method provided by the present application. In other implementations, the server 1030 may execute the image processing method and the image matching method provided by the present application by calling an application program stored outside the server.

The network 1020 may be a single network, or a combination of at least two different networks. For example, the network 1020 may include, but is not limited to, one type or a combination of several types of a local area network, a wide area network, a public network, a private network, and so on.

The server 1030 may be a single server or a server group; and respective servers in the group are connected through a wired or wireless network. A server group may be centralized such as a data center, or may also be distributed. The server 1030 may be local or remote.

The database 1040 may generally refer to a device having a storing function. The database 1030 is mainly used to store various data used, generated, and output from operations of the user terminal 1010 and the server 1030. The database 1040 may be local or remote. The database 1040 may include various memories, such as a Random Access Memory (RAM) and a Read Only Memory (ROM). The above-mentioned storage devices are just some examples enumerated, and the storage devices that can be used by the system are not limited thereto.

The database 1040 may be in connection or communication with the server 1030 or a portion thereof via the network 1020, or in direct connection or communication with the server 1030; or have the above-described two modes combined.

In some embodiments, the database 1050 may be a stand-alone device. In other embodiments, the database 1050 may also be integrated into at least one of the user terminal 1010 and the server 1040. For example, the database 1050 may be provided on the user terminal 1010, or may also be provided on the server 1040. For another example, the database 1050 may also be distributed, with one portion thereof provided on the user terminal 1010, and the other portion provided on the server 1040.

Figure 11:
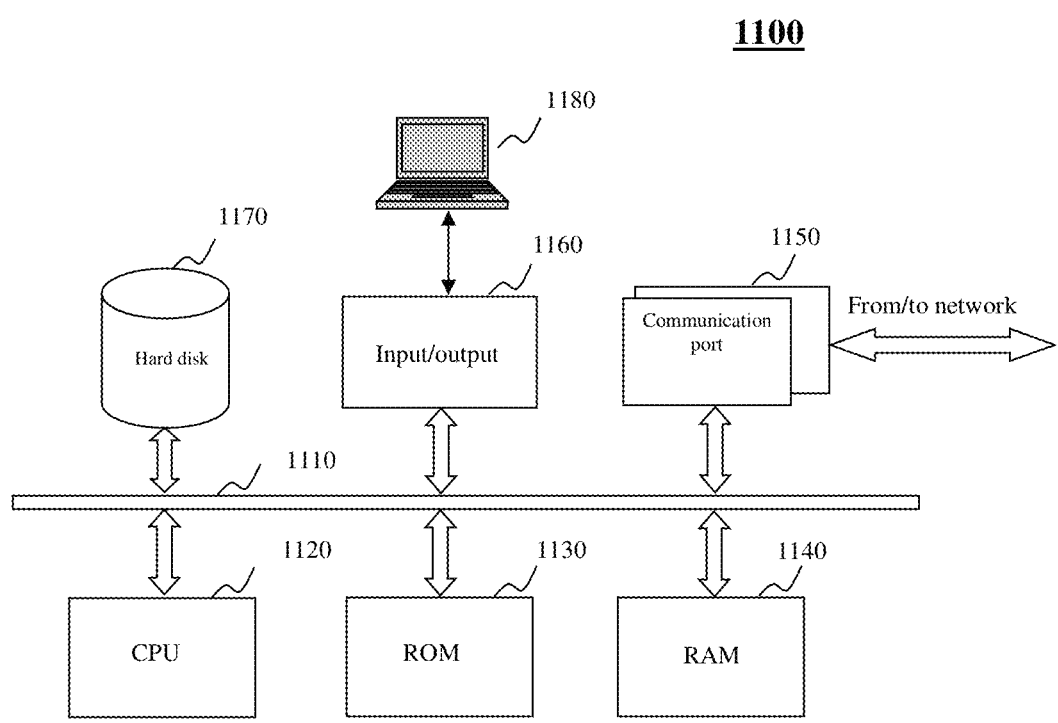
FIG. 11 shows a schematic diagram of a computing device according to an embodiment of the present application.

In addition, the method or the device according to the embodiments of the present application may also be implemented by means of an architecture of the computing device shown in FIG. 11. FIG. 11 shows the architecture of the computing device. As shown in FIG. 11, the computing device 1100 may include a bus 1110, one or at least two CPUs 1120, a Read Only Memory (ROM) 1130, a Random Access Memory (RAM) 1140, a communication port 1150 coupled to a network, an input/output component 1160, a hard disk 1170, etc. the storage device in the computing device 1100, for example, the ROM 1130 or the hard disk 1170, may store various data or files used in processing and/or communication of the method for detecting a target in a video provided by the present application as well as program instructions executed by the CPU. The computing device 1100 may further include a user interface 1180. Of course, the architecture shown in FIG. 11 is only exemplary; when implementing different devices, one or at least two components in the computing device shown in FIG. 11 may be omitted according to actual needs.

The embodiment of the present application may also be implemented as a computer-readable storage medium. The computer-readable storage medium according to the embodiment of the present application stores computer-readable instructions. The computer-readable instructions, when run by a processor, may execute the method according to the embodiment of the present application described with reference to the above accompanying drawings. The computer-readable storage medium comprises, but is not limited to, for example, a volatile memory and/or a non-volatile memory. The volatile memory may include, for example, a Random-Access Memory (RAM) and/or a cache, and the like. The non-volatile memory may include, for example, a Read Only Memory (ROM), a hard disk, a flash memory, and the like.

Those skilled in the art can understand that, the content disclosed by the present application may have a number of transformations and improvements. For example, the various devices or components as described above may be implemented by hardware, or may also be implemented by software, firmware, or a combination of some or all of the three.

In addition, as shown in the present application and claims, unless the context clearly indicates an exception, the words such as "a", "an" and/or "the" are not specific to singular, or may also include plural. In general, the terms "include" and "comprise" only suggest that steps and elements that are clearly identified are included, these steps and elements do not constitute an exclusive list, and the method or the device may also comprise other steps or elements.

Furthermore, although the present application makes various references to certain units in the system according to the embodiment of the present application, any number of different units may be used and run on a client and/or a server. The units are merely illustrative, and different aspects of the system and the method may use different units.

In addition, the flow chart is used in the present application to illustrate the operations executed by the system according to the embodiment of the present application. It should be understood that, preceding or following operations are not necessarily executed precisely in order. Instead, the respective steps may be processed in a reverse order or at a same time. Meanwhile, other operations may also be added to these processes, or a certain step or several steps may be removed from these processes.

Unless otherwise defined, all terms used herein (including technical and scientific terms) have a same meaning as commonly understood by those ordinarily skilled in the art to which the present disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

The above are illustrations of the present disclosure, and should not be considered as limitations thereof. Although several exemplary embodiments of the present disclosure are described, those skilled in the art will readily understand that, a number of modifications can be made to the exemplary embodiments without departing from novel teaching and advantages of the present disclosure. Therefore, all these modifications are intended to be included in the scope of the present disclosure as defined in the claims. It should be understood that, the above are illustrations of the present disclosure, and should not be considered as limited to the specific embodiments disclosed, and the modifications to the disclosed embodiments and other embodiments are intended to be included in the scope of the appended claims. The present disclosure is defined by the claims and equivalents thereof.

The invention claimed is:

1. An image processing method, executed by at least one hardware processor, comprising:
   processing an input image to obtain an image feature of the input image;
   processing the image feature to determine a plurality of local image features of the image feature;
   determining a plurality of local feature vectors corresponding to the plurality of local image features respectively;
   determining a hash code of the input image based on the plurality of local feature vectors;
   wherein the determining a hash code of the input image based on the plurality of local feature vectors, comprises:
   mapping each of the plurality of local feature vectors into each of a plurality of sub-hash codes of an equal length respectively; and
   combining the plurality of sub-hash codes to obtain the hash code of the input image, wherein the combining the plurality of sub-hash codes to obtain the hash code of the input image comprises:
   arranging the plurality of sub-hash codes according to a spatial arrangement mode of a local region corresponding each sub-hash code, to obtain the hash code of the image, wherein the hash code includes a plurality of layers, an i-th layer of the hash code includes an i-th hash bit of each sub-hash code, and the i-th layer is a matrix formed by arranging the i-th hash bit of the sub-hash code according to the spatial arrangement mode of the local region corresponding to each sub-hash code, where i is an integer greater than or equal to 1 and less than or equal to K, and K is a length of each sub-hash code.

2. The image processing method according to claim 1, wherein the processing the image feature to determine a plurality of local image features of the image feature comprises:
   segmenting the image feature at a preset size, to determine a plurality of local regions of the image feature;
   determining information of the image feature that corresponds to each local region in the plurality of local regions as a local image feature corresponding to the local region respectively.

3. The image processing method according to claim 2, wherein the image feature includes feature maps of a plurality of channels, and the local image feature corresponding to each local region includes a channel local feature of a corresponding local region of the feature map of each channel in the feature maps of the plurality of channels.

4. The image processing method according to claim 3, wherein the determining a plurality of local feature vectors corresponding to the plurality of local image features respectively comprises:
   pooling the channel local feature of the corresponding local region in a feature map of each channel for each local image feature, to determine the local feature vector corresponding to the local image feature.

5. The image processing method according to claim 1, wherein processing an input image to obtain an image feature of the input image comprises:
   extracting the image feature of the input image by a trained neural network.

6. An image data processing device, the device comprising a memory and a processor, wherein the memory has instructions stored thereon, and when the processor is used to execute the instructions, the processor is caused to execute an image processing method, comprising:
   processing an input image to obtain an image feature of the input image;
   processing the image feature to determine a plurality of local image features of the image feature;
   determining a plurality of local feature vectors corresponding to the plurality of local image features respectively;
   determining a hash code of the input image based on the plurality of local feature vectors,
   wherein the determining a hash code of the input image based on the plurality of local feature vectors, comprises:
   mapping each of the plurality of local feature vectors into each of a plurality of sub-hash codes of an equal length respectively; and
   combining the plurality of sub-hash codes to obtain the hash code of the input image, wherein the combining the plurality of sub-hash codes to obtain the hash code of the input image comprises:
   arranging the plurality of sub-hash codes according to a spatial arrangement mode of a local region corresponding each sub-hash code, to obtain the hash code of the image, wherein the hash code includes a plurality of layers, an i-th layer of the hash code includes an i-th hash bit of each sub-hash code, and the i-th layer is a matrix formed by arranging the i-th hash bit of the sub-hash code according to the spatial arrangement mode of the local region corresponding to each sub-hash code, where i is an integer greater than or equal to 1 and less than or equal to K, and K is a length of each sub-hash code.

7. The image data processing device according to claim 6, wherein the processing the image feature to determine a plurality of local image features of the image feature comprises:
   segmenting the image feature at a preset size, to determine a plurality of local regions of the image feature;
   determining information of the image feature that corresponds to each local region in the plurality of local regions as a local image feature corresponding to the local region, respectively.

8. The image data processing device according to claim 7, wherein the image feature include feature maps of a plurality of channels, the local image feature corresponding to each local region includes a channel local feature of a corresponding local region of a feature map of each channel in the feature maps of the plurality of channels.

9. The image data processing device according to claim 8, wherein the determining a plurality of local feature vectors respectively corresponding to the plurality of local image features comprises:
   pooling the channel local feature of a corresponding local region in the feature map of each channel with respect to each local image feature, to determine the local feature vector corresponding to the local image feature.

10. A computer-readable non-transitory storage medium, having instructions stored thereon, wherein the instructions, when executed by a processor, causes the processor to execute an image processing method, comprising:
    processing an input image to obtain an image feature of the input image;

processing the image feature to determine a plurality of local image features of the image feature;

determining a plurality of local feature vectors corresponding to the plurality of local image features respectively;

determining a hash code of the input image based on the plurality of local feature vectors, wherein the determining a hash code of the input image based on the plurality of local feature vectors, comprises:

mapping each of the plurality of local feature vectors into each of a plurality of sub-hash codes of an equal length respectively; and combining the plurality of sub-hash codes to obtain the hash code of the input image, wherein the combining the plurality of sub-hash codes to obtain the hash code of the input image comprises:

arranging the plurality of sub-hash codes according to a spatial arrangement mode of a local region corresponding each sub-hash code, to obtain the hash code of the image, wherein the hash code includes a plurality of layers, an i-th layer of the hash code includes an i-th hash bit of each sub-hash code, and the i-th layer is a matrix formed by arranging the i-th hash bit of the sub-hash code according to the spatial arrangement mode of the local region corresponding to each sub-hash code, where i is an integer greater than or equal to 1 and less than or equal to K, and K is a length of each sub-hash code.

* * * * *